United States Patent
Tomiyama et al.

(10) Patent No.: US 11,607,832 B2
(45) Date of Patent: Mar. 21, 2023

(54) FEED BLOCK AND SHEET MANUFACTURING APPARATUS PROVIDED WITH THE SAME, AND METHOD OF MANUFACTURING SHEET

(71) Applicant: Japan Steel Works, Ltd., Tokyo (JP)

(72) Inventors: Hideki Tomiyama, Hiroshima (JP); Makoto Iwamura, Hiroshima (JP); Masaki Ueda, Hiroshima (JP); Kazuya Yokomizo, Hiroshima (JP); Yousuke Tago, Hiroshima (JP)

(73) Assignee: JAPAN STEEL WORKS, LTD., Tokyo (JP)

( * ) Notice: Subject to any disclaimer, the term of this patent is extended or adjusted under 35 U.S.C. 154(b) by 339 days.

(21) Appl. No.: 16/329,988

(22) PCT Filed: Sep. 2, 2016

(86) PCT No.: PCT/JP2016/075785
§ 371 (c)(1),
(2) Date: Mar. 1, 2019

(87) PCT Pub. No.: WO2018/042617
PCT Pub. Date: Mar. 8, 2018

(65) Prior Publication Data
US 2019/0202105 A1    Jul. 4, 2019

(51) Int. Cl.
*B29C 48/495* (2019.01)
*B29C 48/305* (2019.01)
(Continued)

(52) U.S. Cl.
CPC ............ *B29C 48/495* (2019.02); *B29C 48/07* (2019.02); *B29C 48/08* (2019.02); *B29C 48/18* (2019.02);
(Continued)

(58) Field of Classification Search
CPC ...... B29C 48/495; B29C 48/18; B29C 48/305; B29C 48/19; B29C 48/07; B29C 48/08;
(Continued)

(56) References Cited

U.S. PATENT DOCUMENTS 3,583,032 A * 6/1971 Stafford .................. B29C 48/08
425/133.5
5,211,898 A * 5/1993 Shinmoto ............... B29C 48/49
425/197
(Continued)

FOREIGN PATENT DOCUMENTS

EP   1 721 723 A1   11/2006
EP   1 829 667 A1   9/2007
(Continued)

OTHER PUBLICATIONS

Derwent abstractor JP-2009029104-A. Kido, Koji. Feb. 2009.*
International Search Report dated Oct. 4, 2016 in PCT/JP2016/075785 with English-language translation (4 pgs.).

*Primary Examiner* — Philip C Tucker
*Assistant Examiner* — Jimmy R Smith, Jr.
(74) *Attorney, Agent, or Firm* — Foley & Lardner LLP

(57) ABSTRACT

It is an object of the present invention to provide a feed block that can stably produce a resin sheet in which a main material and an auxiliary material are stacked on top of another. The feed block feeds laminated molten resin P to a die, wherein laminated molten resin P has at least one main material A that consists of a molten resin in a shape of a plate or a sheet and auxiliary material B that consists of a molten resin in a shape of a plate or a sheet, wherein auxiliary material B is stacked on at least a part of at least one main material A with regard to a width direction thereof. The feed block has: at least one main material forming channel 17, 18 that allows a molten resin to flow therethrough in order to form main material A into a shape of a plate or a sheet;
(Continued)

auxiliary material forming channel 19 that allows a molten resin to flow therethrough in order to form auxiliary material B into a shape of a plate or a sheet; merging section 23 that forms laminated molten resin P, wherein at least one main material forming channel 17, 18 and auxiliary material forming channel 19 merge at merging section 23; and channel 24 for laminated molten resin P that is located downstream of merging section 23 and that feeds laminated molten resin P to the die.

17 Claims, 14 Drawing Sheets

(51) Int. Cl.
| | | |
|---|---|---|
| *B32B 27/08* | (2006.01) | |
| *B32B 37/15* | (2006.01) | |
| *B29C 48/21* | (2019.01) | |
| *B29C 48/18* | (2019.01) | |
| *B29C 48/19* | (2019.01) | |
| *B29C 48/07* | (2019.01) | |
| *B29C 48/08* | (2019.01) | |
| *B29C 48/12* | (2019.01) | |
| *B29K 23/00* | (2006.01) | |
| *B29L 7/00* | (2006.01) | |
| *B29L 9/00* | (2006.01) | |

(52) U.S. Cl.
CPC ............ *B29C 48/19* (2019.02); *B29C 48/305* (2019.02); *B29C 48/307* (2019.02); *B32B 27/08* (2013.01); *B32B 37/153* (2013.01); *B29C 48/12* (2019.02); *B29C 48/21* (2019.02); *B29K 2023/12* (2013.01); *B29L 2007/002* (2013.01); *B29L 2009/00* (2013.01)

(58) Field of Classification Search
CPC ....... B29C 48/307; B29C 48/12; B29C 48/21; B29C 48/49; B32B 27/08; B32B 37/153; B29K 2023/12; B29L 2007/002; B29L 2009/00
USPC ...................................................... 264/173.16
See application file for complete search history.

(56) References Cited

U.S. PATENT DOCUMENTS

| | | | |
|---|---|---|---|
| 2001/0005517 A1* | 6/2001 | Kegasawa | ............... B29C 48/08 425/131.1 |
| 2003/0193108 A1* | 10/2003 | Kegasawa | ............. B29C 48/256 264/171.13 |
| 2006/0147686 A1* | 7/2006 | Ausen | .................... B29C 48/08 428/212 |
| 2007/0262484 A1 | 11/2007 | Fujii et al. | |
| 2012/0313275 A1* | 12/2012 | Trice | ....................... B29C 48/92 264/40.1 |
| 2015/0104535 A1 | 4/2015 | Truscott | |

FOREIGN PATENT DOCUMENTS

| | | | | |
|---|---|---|---|---|
| EP | 2 979 840 A2 | | 2/2016 | |
| JP | S62-149411 A | | 7/1987 | |
| JP | 2003-305762 A | | 10/2003 | |
| JP | 2006-130744 A | | 5/2006 | |
| JP | 2006130744 A | * | 5/2006 | ............ B29C 48/19 |
| JP | 2009-029104 A | | 2/2009 | |
| JP | 2009029104 A | * | 2/2009 | |
| JP | 5220607 B2 | | 6/2013 | |
| JP | 2013-180476 A | | 9/2013 | |
| JP | 2014-100798 A | | 6/2014 | |
| WO | WO-2006/048956 A1 | | 5/2006 | |

* cited by examiner

| Example | 1 | 2 | 3 | 4 |
|---|---|---|---|---|
| Configuration of the merging section of the channel forming block | 10, 3, 30, 25, 100 | 8, 9, 30 | 10, 15, 30 | 10, 3, 30, 3 |
| Discharge rate of main material | 15kg/h | 12kg/h | 20kg/h | 15kg/h |
| Discharge rate of auxiliary material | 100kg/h | 100kg/h | 100kg/h | 100kg/h |
| Layer configuration of the sheet that is formed | 1050, 45, 320, 0.18, 0.4 | 1040, 75, 310, 0.14, 0.4 | 1055, 120, 320, 0.19, 0.4 | 1050, 40, 300, 40, 0.18, 0.4 |

FEED BLOCK AND SHEET MANUFACTURING APPARATUS PROVIDED WITH THE SAME, AND METHOD OF MANUFACTURING SHEET

CROSS REFERENCE TO RELATED APPLICATION

This application is a national stage entry of International Appl. PCT/JP2016/075785, filed Sep. 2, 2016; the contents of which are incorporated by reference herein in their entirety.

TECHNICAL FIELD

The present invention relates to a feed block that feeds a laminated molten resin to a die.

BACKGROUND ART

There has been known a resin sheet in which an auxiliary material is stacked on a main material that forms the sheet over only a limited region thereof in the width direction. Such a sheet can be manufactured by feeding an auxiliary material from an orifice or a probe that is provided in a die. However, this manufacturing method is problematic in that the die itself needs a complicated structure and in that the orifice and probe can only be applied to a sheet having a specific configuration.

JP5220607B discloses a feed block that is provided upstream of a die. The feed block includes main material forming channels, which are two separate parts, and an auxiliary material forming channel that is provided between the main material forming channels. Two outlets of the main material forming channels and one outlet of the auxiliary material forming channel located therebetween are provided on the outlet surface of the feed block that faces the die. The main material and the auxiliary material are fed from the outlets of the feed block to the die, are then stacked on top of another in the die to be formed into a sheet shape, and is extruded from the outlet of the die.

According to this method, a common die can be used by replacing the feed block in order to manufacture various resin sheets having an auxiliary material that is stacked on different conditions. However, since the main material and the auxiliary material are stacked on top of another in the die, it is difficult to obtain a stable layer structure.

It is an object of the present invention to provide a feed block that is capable of stably manufacturing a resin sheet in which a main material and an auxiliary material are stacked on top of another.

A feed block of the present invention feeds a laminated molten resin to a die, wherein the laminated molten resin has at least one main material that consists of a molten resin in a shape of a plate or a sheet and an auxiliary material that consists of a molten resin in a shape of a plate or a sheet, wherein the auxiliary material is stacked on at least a part of the at least one main material with regard to a width direction thereof. The feed block comprises: at least one main material forming channel that allows a molten resin to flow therethrough in order to form the main material into a shape of a plate or a sheet; an auxiliary material forming channel that allows a molten resin to flow therethrough in order to form the auxiliary material into a shape of a plate or a sheet; a merging section that forms the laminated molten resin, wherein the at least one main material forming channel and the auxiliary material forming channel merge at the merging section; and a channel for the laminated molten resin that is located downstream of the merging section and that feeds the laminated molten resin to the die.

The main material that is fed from the main material forming channel and the auxiliary material that is fed from the auxiliary material forming channel are stacked on top of another at the merging section where the main material forming channel and the auxiliary material forming channel merge, and are fed to a die through the channel for the layers. As a result, a laminated molten resin whose layer configuration is adjusted in advance can be fed to the die. Therefore, according to the feed block of the present invention, a resin sheet in which the main material and the auxiliary material are stacked on top of another can be stably manufactured.

BRIEF DESCRIPTION OF DRAWINGS

FIG. 11 is a view illustrating Embodiments.

REFERENCE SIGNS

Figure 1:
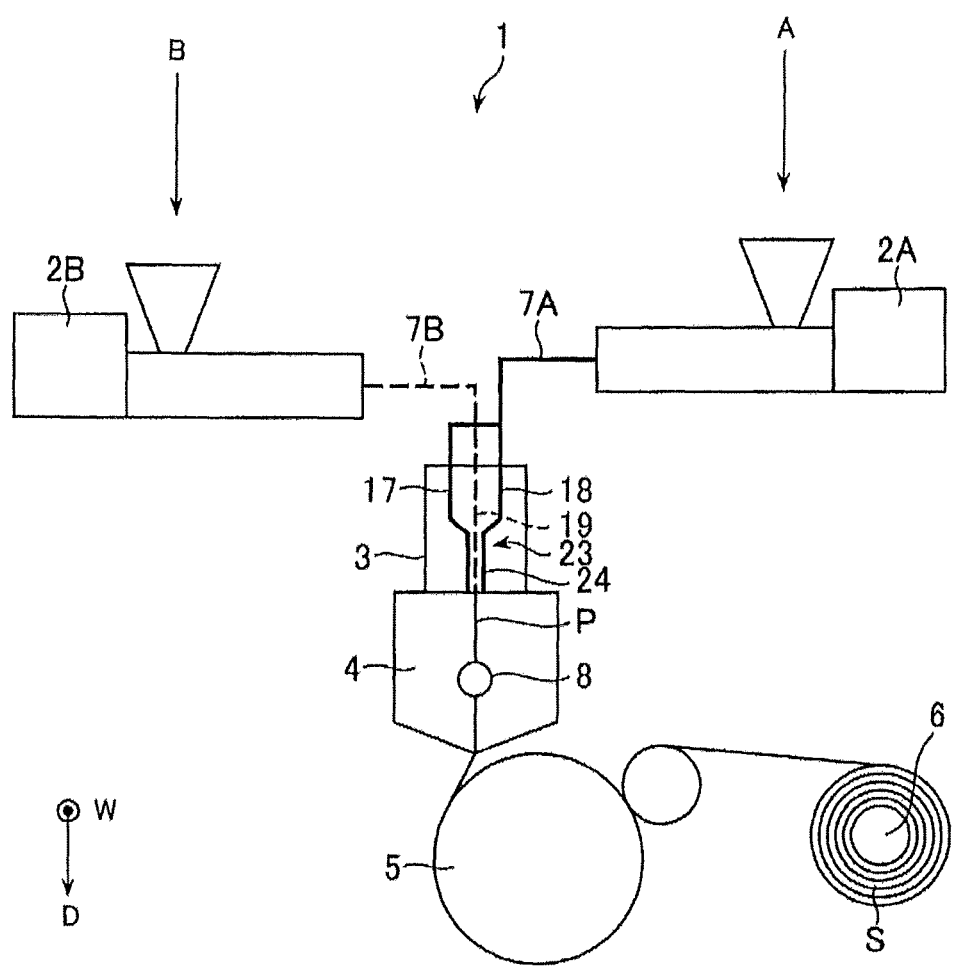
FIG. 1 is a schematic view of the configuration of a sheet manufacturing apparatus according to an embodiment of the present invention.

1 sheet manufacturing apparatus
2A first extruder 2B second extruder
3 feed block
4 die
5 cooling roll
6 take-up roll
7A main material supply pipe
7B auxiliary material supply pipe
8 manifold
11 first main material inlet channel
12 second main material inlet channel
13 auxiliary material inlet channel
14 first main material feeding channel
15 second main material feeding channel
16 auxiliary material feeding channel
17 first main material forming channel
18 second main material forming channel
19 auxiliary material forming channel
20 first main material feeding port
21 second main material feeding port
22 auxiliary material feeding port
23 merging section
24 channel for a laminated molten resin
25 resin inlet surface
26 resin outlet surface
27 opening
28 housing
29 internal space
30 channel forming block
31a to 31d channel forming element
32 cover member
33 first region
34 second region
35 transition region
36 void region
A main material
B auxiliary material
D depth direction
h17 channel height of the first main material forming channel
h18 channel height of the second main material forming channel
h19 channel height of the auxiliary material forming channel
P laminated molten resin
S product sheet
W width direction

DESCRIPTION OF EMBODIMENTS

Embodiments of the present invention will be described with reference to the drawings. In the description below, "width direction W" refers to a direction parallel to the width direction of a sheet. "Depth direction D" corresponds to the direction of the channel of a molten resin and is a direction that is perpendicular both to the resin inlet surface and to the resin outlet surface of a feed block. "Channel height" is a dimension of the channel in a direction that is perpendicular both to width direction W and to depth direction D.

FIG. 1 shows a schematic configuration of a sheet manufacturing apparatus according to an embodiment of the present invention. Sheet manufacturing apparatus 1 has first extruder 2A that feeds main material A, second extruder 2B that feeds auxiliary material B, feed block 3, die 4, cooling roll 5 and take-up roll 6. First extruder 2A mixes a raw resin of main material A in order to form a molten resin of main material A, and feeds the molten resin of main material A to feed block 3 through main material supply pipe 7A. Second extruder 2B mixes a raw resin of auxiliary material B in order to form a molten resin of auxiliary material B, and feeds the molten resin of auxiliary material B to feed block 3 through auxiliary material supply pipe 7B. Feed block 3 forms a laminated molten resin in which auxiliary material B is stacked on a part of main material A with regard to width direction W, and feeds the molten resin to die 4. Sheet manufacturing apparatus 1 of the present embodiment manufactures a sheet of the so-called encapsulation structure in which auxiliary material B is stacked on a part of main material A with regard to width direction W and is covered with main material A, and thus, a laminated molten resin having a corresponding configuration is formed. However, the arrangement of the laminated molten resin is not limited to this, as long as an auxiliary material is stacked on at least a part of at least one main material with regard to the width direction. The layer construction of main material A is not limited. Main material A is formed of a single layer here for the purpose of illustration, but may consist of two or more layers.

Die 4 broadens the laminated molten resin that is fed from feed block 3 to a target width in manifold 8, and extrudes it into the atmosphere. The laminated molten resin that has been extruded is solidified by means of cooling roll 5, and is wound by take-up roll 6 as product sheet S. Die 4 is a T die in the embodiment, but may be an L die or any other die. The width of die 4, which directly defines the width of intended product sheet S, is set, for example, between several hundred millimeters and 6000 mm. Since feed block 3 is a component for forming a laminated molten resin that is fed to die 4, the width of the channel is comparatively narrow, and is generally between about 100 mm and 500 mm.

Figure 2:
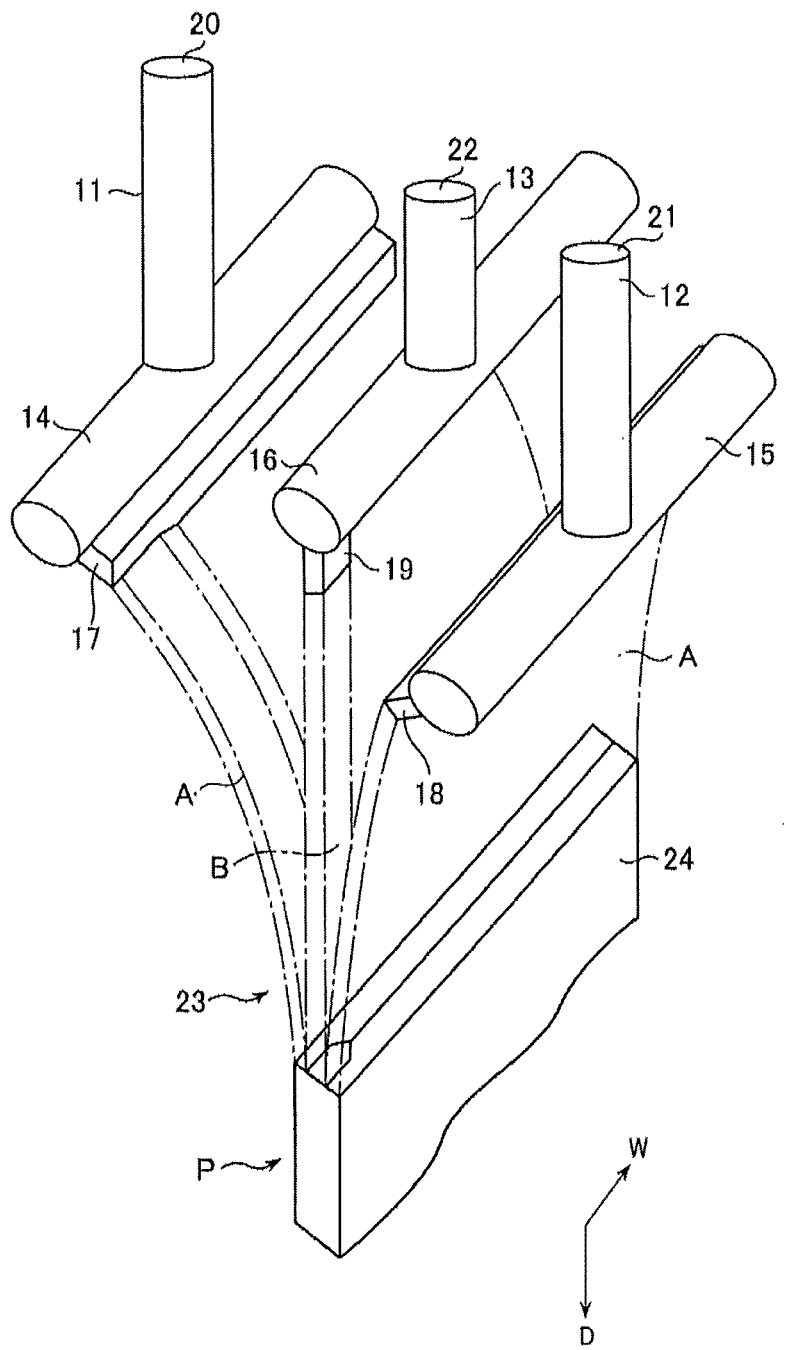
FIG. 2 is a schematic view of internal channels of a feed block.
Figure 3:
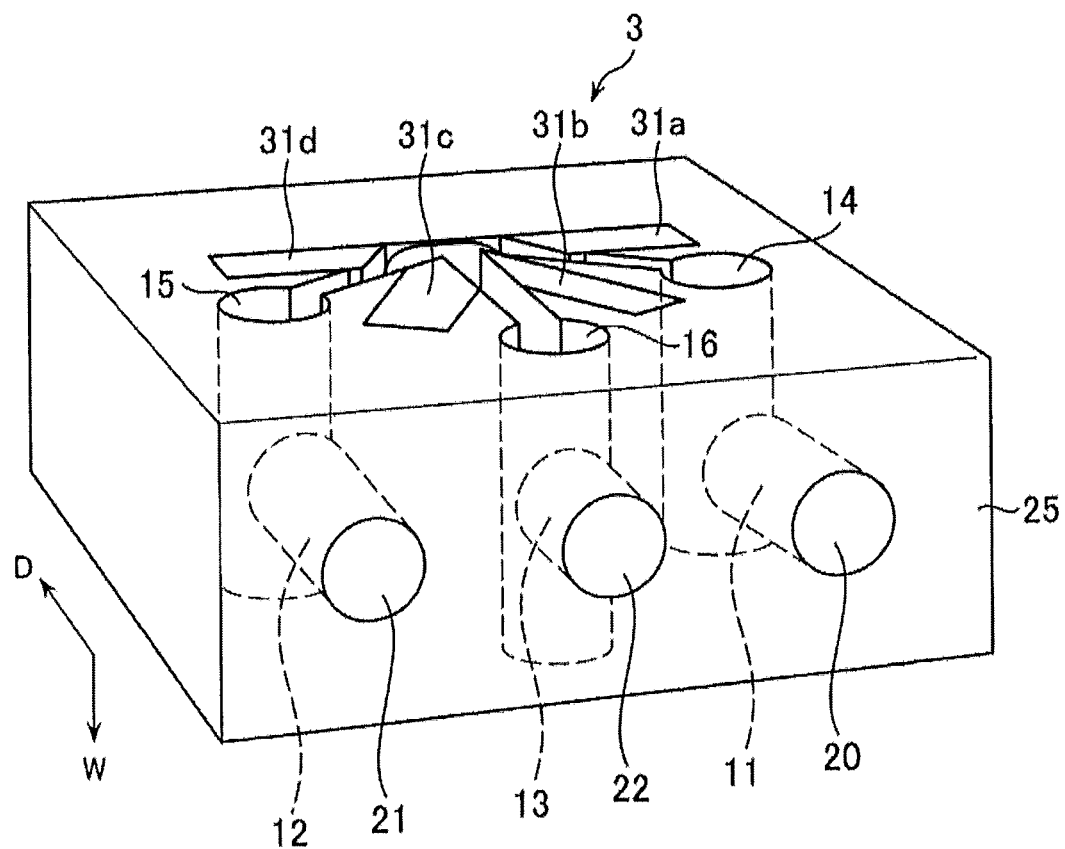
FIG. 3 is a perspective view of the feed block shown in FIG. 2, as viewed from the side of the resin inlet.
Figure 4:
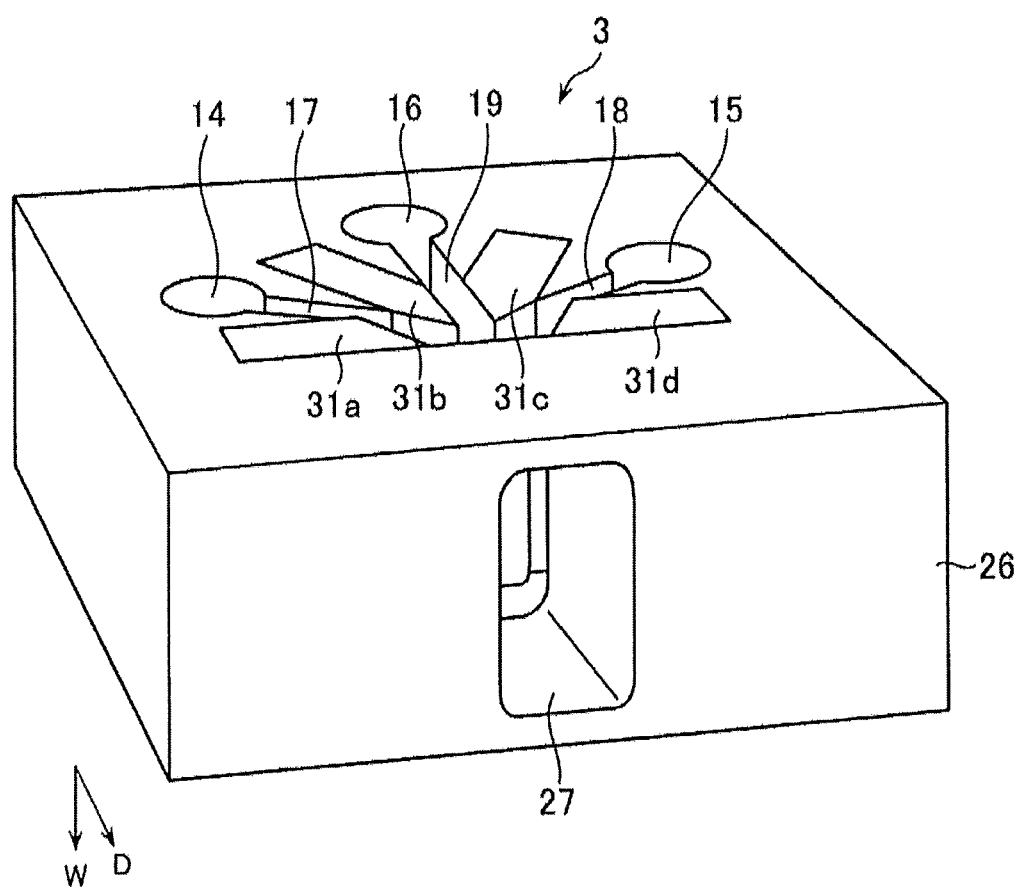
FIG. 4 is a perspective view of the feed block shown in FIG. 2, as viewed from the side of the resin outlet.

FIG. 2 shows a schematic view of the internal channels of the feed block, FIG. 3 shows a perspective view of the feed block, as viewed from the inlet side of resin, and FIG. 4 shows a perspective view of the feed block, as viewed from the outlet side of the resin. In FIG. 2, although channel 24 for a laminated molten resin is shown separated from main material forming channels 14, 15 and auxiliary material forming channel 16 for convenience, channels 14, 15, 16, 24 are actually connected with each other at merging section 23. Feed block 3 may have various channel structures in accordance with the configuration of a laminated molten resin. As an example, an arrangement will be described here in which the main and the auxiliary materials merge at the same time from three directions.

Feed block 3 has first and second main material forming channels 17, 18 that allow a molten resin of main material A to flow therethrough in order to form the molten resin into a shape of a plate or a sheet, and one auxiliary material forming channel 19 that allows a molten resin of auxiliary material B to flow therethrough in order to form the molten resin into a shape of a plate or a sheet. The number of the main material forming channels is not limited to this, and at least one main material forming channel may be provided. First main material forming channel 17, second main material forming channel 18 and auxiliary material forming channel 19 extend in width direction W. Auxiliary material forming channel 19 is located between first main material forming channel 17 and second main material forming channel 18. First main material forming channel 17, second main material forming channel 18 and auxiliary material forming channel 19 merge at merging section 23 in feed block 3, and laminated molten resin P in which main materials A are stacked on both sides of auxiliary material B is formed at merging section 23. A single channel 24 for laminated molten resin P that feeds laminated molten resin P to die 4 is provided downstream of merging section 23.

First main material forming channel 17 is connected to cylindrical first main material feeding channel 14 that extends in width direction W. Second main material forming channel 18 is connected to cylindrical second main material feeding channel 15 that extends in width direction W. Auxiliary material forming channel 19 is connected to cylindrical auxiliary material feeding channel 16 that extends in width direction W. First and second main material feeding channels 14, 15 and auxiliary material feeding channel 16 extend through feed block 3 in width direction W, and both ends thereof are closed by cover members 32 (see FIG. 5) that are fixed to feed block 3 by means of bolts. First main material inlet channel 11 that extends in depth direction D is connected to first main material feeding channel 14 at the central area thereof with regard to width direction W. Second main material inlet channel 12 that extends in depth direction D is connected to second main material feeding channel 15 at the central area thereof with regard to width direction W. Auxiliary material inlet channel 13 that extends in depth direction D is connected to auxiliary material feeding channel 16 at the central area thereof with regard to width direction W. First main material inlet channel 11 has first main material feeding port 20 that is open at resin inlet surface 25 of feed block 3 and that is connected to main material supply pipe 7A. Second main material inlet channel 12 has second main material feeding port 21 that is open at resin inlet surface 25 of feed block 3 and that is connected to main material supply pipe 7A. Auxiliary material inlet channel 13 has auxiliary material feeding port 22 that is open at resin inlet surface 25 of feed block 3 and that is connected to auxiliary material supply pipe 7B. It is also possible that feed block 3 have a single main material inlet channel and that two main material feeding channels branch from the single main material inlet channel may in feed block 3. Opening 27 of channel 24 is provided on resin outlet surface 26 of feed block 3, and opening 27 is in communication with die 4.

Figure 5:
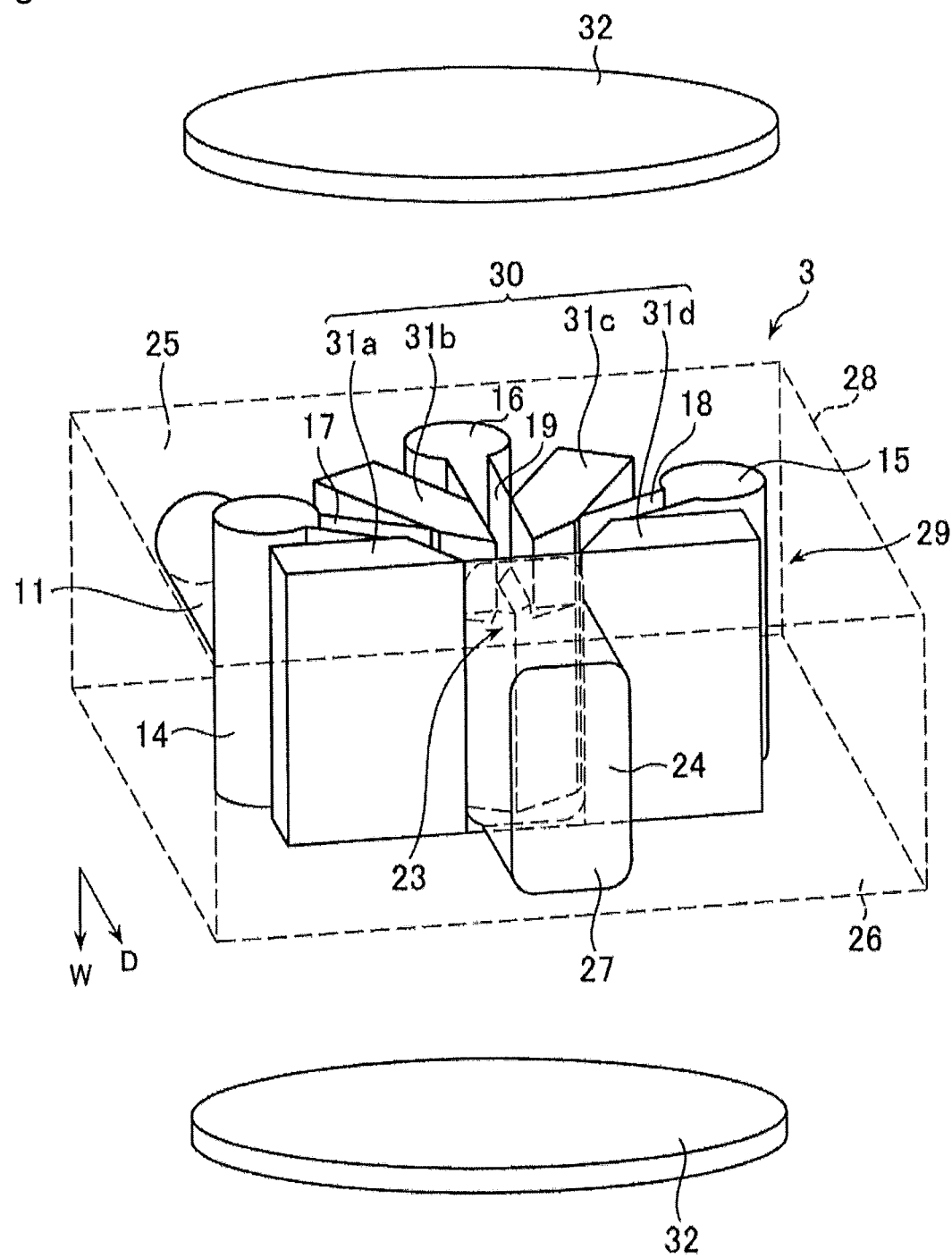
FIG. 5 is a perspective view illustrating an internal structure of the feed block shown in FIG. 2, as viewed from the side of the resin outlet.
Figure 6:
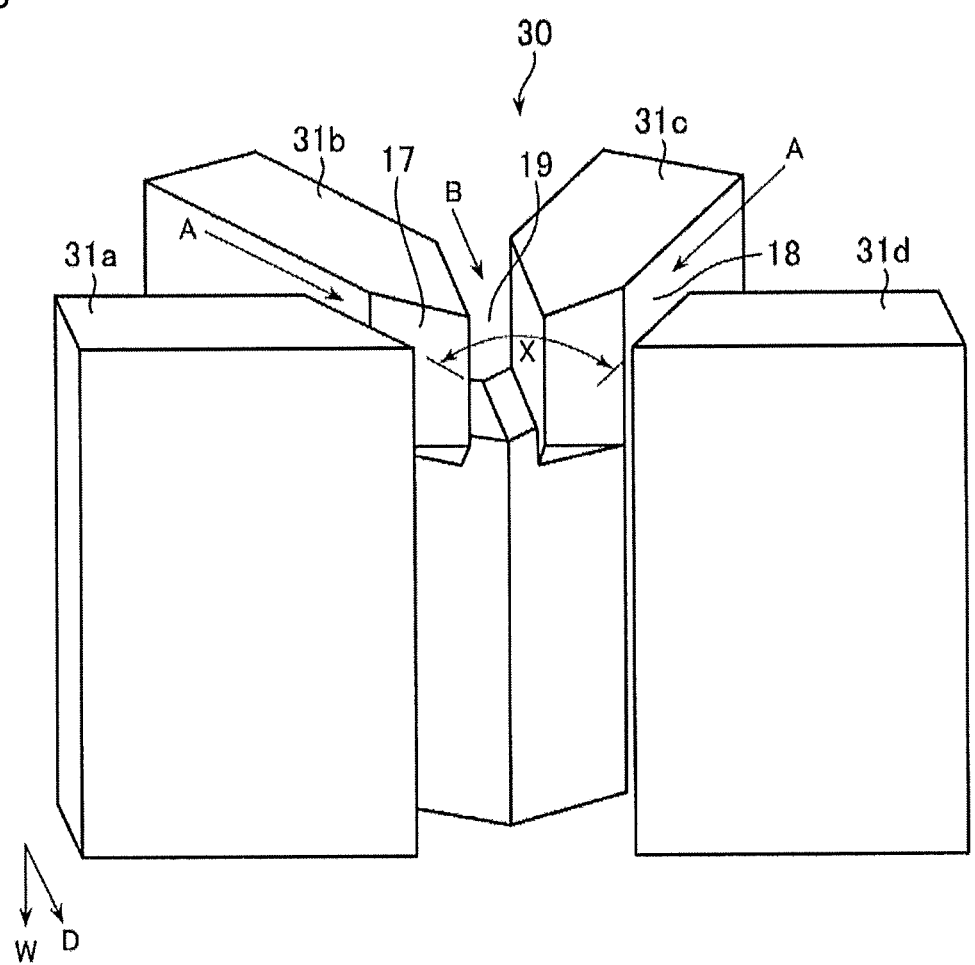
FIG. 6 is a perspective view of a channel forming block of the feed block shown FIG. 5.
Figure 7:
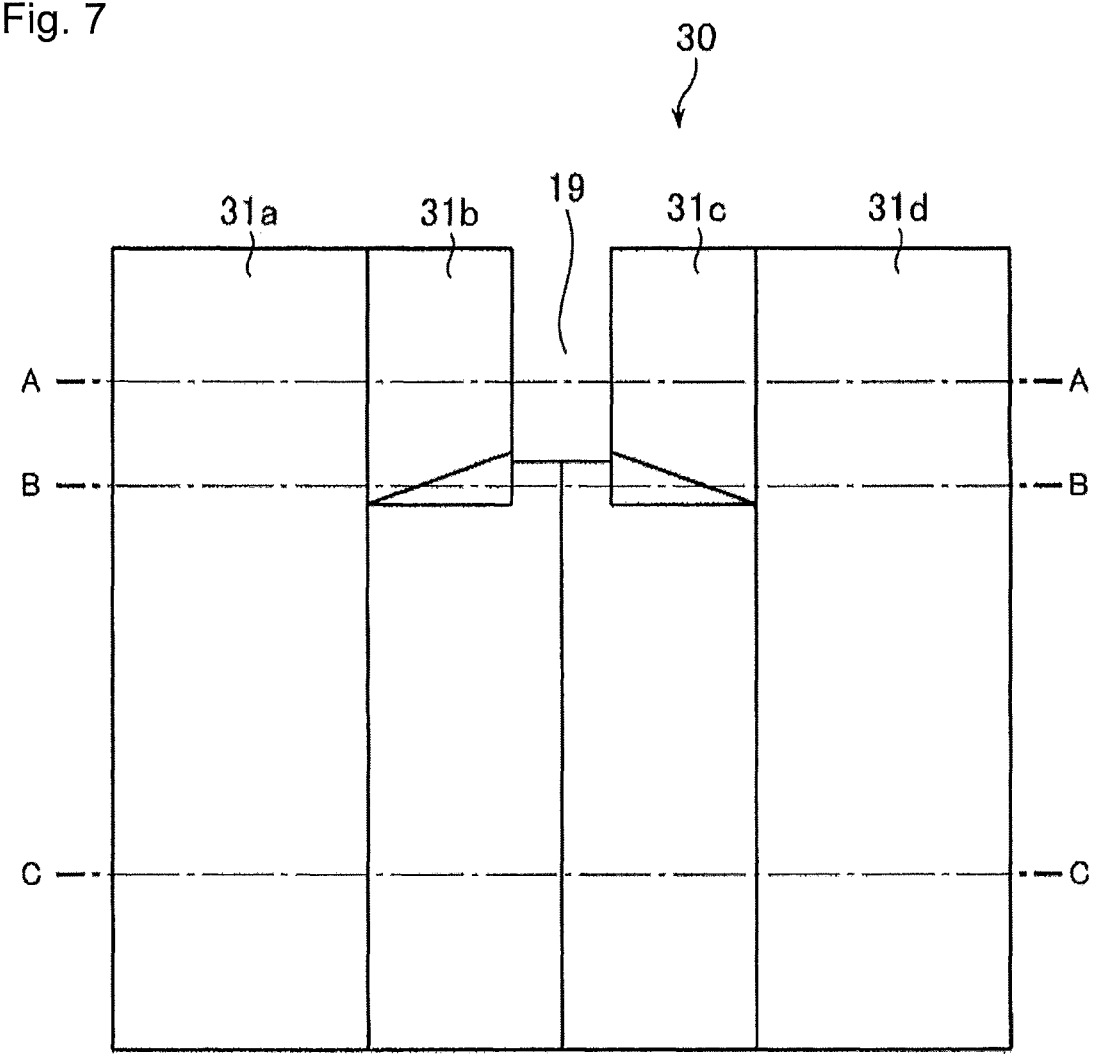
FIG. 7 is a front view of the channel forming block shown in FIG. 6, as viewed from the side of the resin outlet.
Figure 8A:
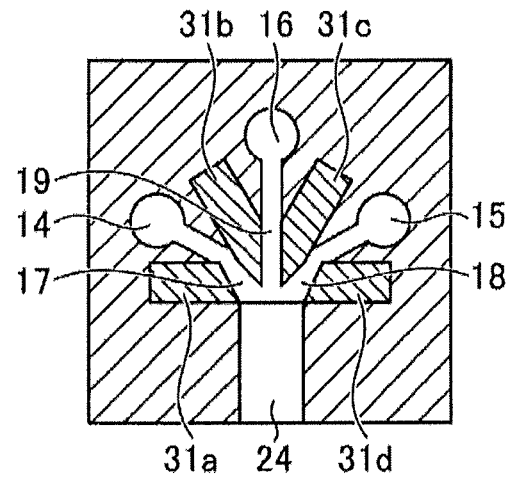
FIG. 8A is a cross-sectional view of the channel forming block taken along line A-A of FIG. 7.
Figure 8B:
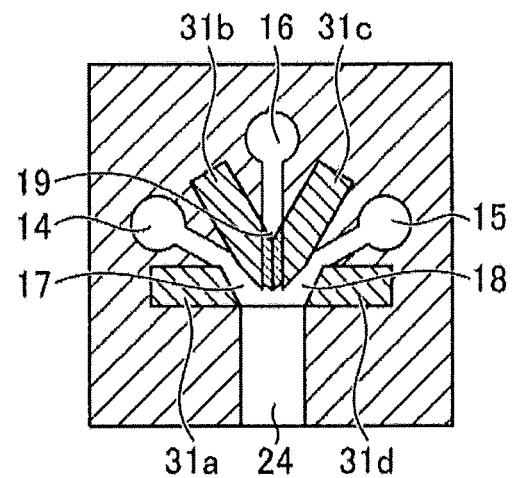
FIG. 8B is a cross-sectional view of the channel forming block taken along line B-B of FIG. 7.
Figure 8C:
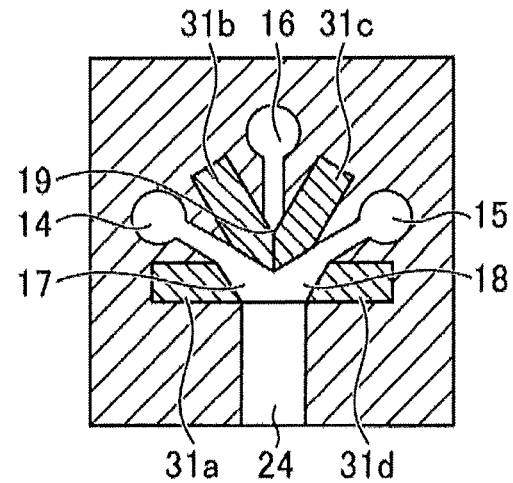
FIG. 8C is a cross-sectional view of the channel forming block taken along line C-C of FIG. 7.

FIG. 5 shows a perspective view illustrating the internal structure of feed block 3, as viewed from the outlet side of the resin, and FIG. 6 shows a perspective view of the channel forming block in which only the channel forming block is taken out from FIG. 5. FIG. 7 shows a front view of the channel forming block, as viewed from the outlet side of the resin, and FIGS. 8A-8C show cross-sectional views of the channel forming block taken along lines A-A, B-B, and C-C in FIG. 7, respectively.

Feed block 3 includes housing 28 having internal space 29 and channel forming block 30 that is housed in internal space 29. Channel forming block 30 forms a part of main material forming channels 17, 18 and a part of auxiliary material forming channel 19. Although not illustrated, channel forming block 30 may form the entire part of the main material forming channel 17, 18 and auxiliary material forming channel 19. Channel forming block 30 consists of a plurality of channel forming elements 31a to 31d that can be separated. Specifically, channel forming block 30 has first to fourth channel forming elements 31a to 31d that extend radially from merging section 23, as viewed in width direction W. First main material forming channel 17 is formed between first channel forming element 31a and second channel forming element 31b, auxiliary material forming channel 19 is formed between second channel forming element 31b and third channel forming element 31c, and second main material forming channel 18 is formed between third channel forming element 31c and fourth channel forming element 31d. First to fourth channel forming elements 31a to 31d are fixed to housing 28 by means of fixing bolts (not shown). Channel forming elements 31a to 31d are provided in order to form the channels for main material A or auxiliary material B therebetween. Therefore, they do not need to be arranged radially, and may be arranged, for example, in parallel to each other.

In addition, an arrangement that does not have channel forming block 30 is also included in the feed block of the present invention. As long as at least one main material forming channel, an auxiliary material forming channel, a merging section and a channel for a laminated molten resin are formed inside, laminated molten resin is formed in the feed block and is fed to die 4 while the distribution of flow rate in width direction W is adjusted. Such a feed block can also achieve the effect of the present invention.

The molten resin of main material A that is fed from first main material inlet channel 11 to first main material feeding channel 14 fills first main material feeding channel 14 in width direction W. First main material forming channel 17 is connected to first main material feeding channel 14 over the entire length in width direction W. In other words, a gap is provided between first channel forming element 31a and second channel forming element 31b over the entire width. This allows the molten resin of main material A to flow into merging section 23 through the entire width of the gap between first channel forming element 31a and second channel forming element 31b. Similarly, the molten resin of main material A that is fed from second main material inlet channel 12 to second main material feeding channel 15 fills second main material feeding channel 15 in width direction W. Second main material forming channel 18 is connected to second main material feeding channel 15 over the entire length in width direction W. In other words, a gap is provided between third channel forming element 31c and fourth channel forming element 31d over the entire width. This allows the molten resin of main material A to flow into merging section 23 through the entire width of the gap between third channel forming element 31c and fourth channel forming element 31d. The molten resin of auxiliary material B that is fed from auxiliary material inlet channel 13 to auxiliary material feeding channel 16 fills auxiliary material feeding channel 16 in width direction W. However, second channel forming element 31b and third channel forming element 31c abut against each other at a part thereof in width direction W (FIGS. 8B, 8C). In other words, the gap between second channel forming element 31b and third channel forming element 31c is only partially provided in width direction W (FIG. 8A). Thus, the molten resin of auxiliary material B flows into merging section 23 through the gap, and laminated molten resin P in which auxiliary material B is stacked on a part of main material A with regard to width direction W is formed.

First to fourth channel forming elements 31a to 31d can be removed from internal space 29 of housing 28. Specifically, one of cover members 32 of feed block 3 is removed first. Next, the fixing bolts of channel forming elements 31a to 31d are removed. Subsequently, each of channel forming elements 31a to 31d is taken out of feed block 3. When another set of channel forming elements 31a to 31d is attached to feed block 3, reverse steps can be taken. Since channel forming elements 31a to 31d can be easily removed and attached in this manner, the position, the shape and so on of auxiliary material B in product sheet S can be easily adjusted.

Figure 9A:
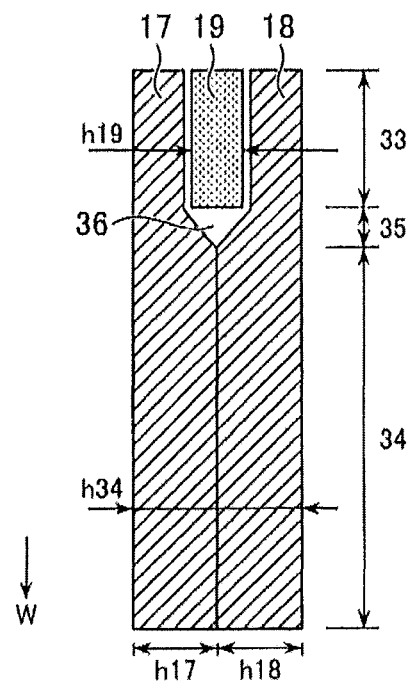
FIG. 9A is a developed view of a merging section of the feed block shown in FIG. 5.

FIG. 9A shows a conceptual view of merging section 23. FIG. 9A is a view in which angular range X in FIG. 6 is developed onto a plane, conceptually illustrating the cross section of first and second main material feeding channels 14, 15 and auxiliary material feeding channel 16 at merging section 23. Merging section 23 has first region 33 and second region 34, as well as transition region 35 that is located between first region 33 and second region 34. These regions 33 to 35 are aligned in width direction W. FIG. 8A shows a cross-sectional view of channel forming elements 31a to 31d in first region 33, FIG. 8B shows a cross-sectional view of channel forming elements 31a to 31d in transition region 35, and FIG. 8C shows cross-sectional view of channel forming elements 31a to 31d in second region 34. In first region 33, auxiliary material forming channel 19 merges with first and second main material forming channels 17, 18, and auxiliary material forming channel 19 is sandwiched between first main material forming channel 17 and second main material forming channel 18. Second region 34 consists of first main material forming channel 17 and second main material forming channel 18. Transition region 35 consists of first main material forming channel 17 and second main material forming channel 18, but channel height h17 of first main material forming channel 17 and channel height h18 of second main material forming channel 18 linearly increase toward second region 34. As a result, an end region of auxiliary material B with regard to the width direction is formed in a tapered shape or in an inclined shape, as described in Examples.

In first region 33 of merging section 23, the combined channel height of channel height h17 of first main material forming channel 17, channel height h18 of second main material forming channel 18 and channel height h19 of auxiliary material forming channel 19 is substantially equal to channel height h34 of second region 34 or channel 24 for the laminated molten resin. Specifically, in first region 33, the combined channel height of channel height h17 of first main material forming channel 17, channel height h18 of second main material forming channel 18 and channel height h19 of auxiliary material forming channel 19 is 80-100% of channel height h34 of second region 34. Immediately below auxiliary material forming channel 19 in transition region 35, i.e., in a region adjacent to auxiliary material forming channel 19 in width direction W, void region 36 is formed in which there is neither first main material forming channels 17, second main material forming channels 18 nor auxiliary material forming channel 19 present. In this way, the shape of auxiliary material forming channel 19 is slightly smaller than the cross-sectional shape of auxiliary material B in laminated molten resin P. This is because the shape and position of auxiliary material B in laminated molten resin P are easily adjusted by adjusting the shape of the main material forming channel since the flow rate of main material A is generally larger than the flow rate of auxiliary material B (see Examples). It may be difficult to obtain an intended shape of auxiliary material B by matching the shape of auxiliary material forming channel 19 to the cross-sectional shape of auxiliary material B in laminated molten resin P because the influence of the flow of main material A is dominant. In contrast, the cross-sectional shape of main material A in laminated molten resin P substantially matches the shapes of first and second main material forming channels 17, 18, and as a result, auxiliary material B fills the region where main material A is not formed.

Figure 10A:
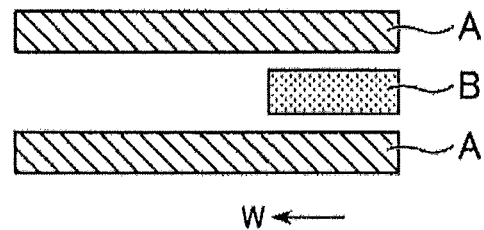
FIG. 10A is a conceptual view illustrating a main material and an auxiliary material that are stacked on top of another in a comparative example.
Figure 10B:
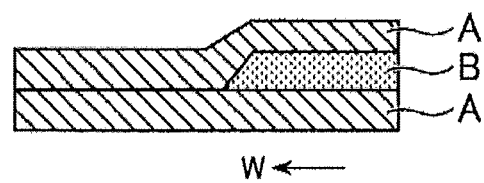
FIG. 10B is a conceptual view illustrating a cross section of a product sheet according to a comparative example.
Figure 10C:
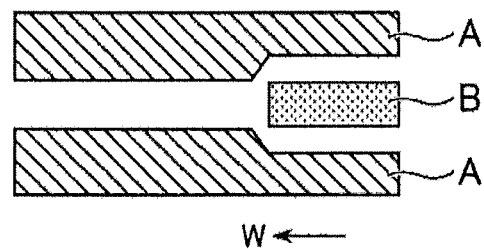
FIG. 10C is a conceptual view illustrating a main material and an auxiliary material that are stacked on top of another in the embodiment.
Figure 10D:
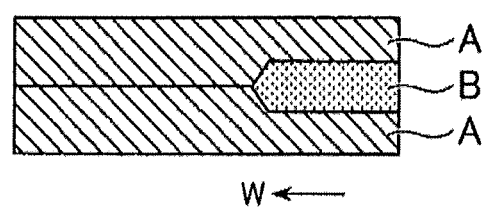
FIG. 10D is a conceptual view illustrating a cross section of a product sheet according to an embodiment.

In addition, the combined channel height thickness of main material A and auxiliary material B is made uniform in width direction W in feed block 3. Therefore, the thickness of product sheet S is also made uniform in width direction W. FIG. 10A shows main material A and auxiliary material B that are obtained at the outlet of a feed block of a comparative example, for example, disclosed in JP5220607B. The thickness of main material A is constant in width direction W. Main material A and auxiliary material B flow into a die with the relative positional relationship shown in FIG. 10A. Main material A near auxiliary material B flows away from auxiliary material B in the die, and auxiliary material B is flatten and broadened in width direction W. Therefore, the thickness of the resin sheet that is discharged from the die is made uniform to some degree in width direction W. However, as shown schematically and with exaggeration in FIG. 10B, the thickness of a resin sheet tends to increase at a location where auxiliary material B is present. FIG. 10C schematically shows the shape and positional relationship of main material A and auxiliary material B at the merging section of the feed block of the present embodiment, and FIG. 10D schematically shows the shape and positional relationship of main material A and auxiliary material B at the outlet the feed block. As shown in these figures, in the present embodiment, the thickness of main material A is reduced in advance at a position where auxiliary material B is stacked, and therefore, laminated molten resin P of main material A and auxiliary material B having a uniform thickness in width direction W is obtained at the outlet of the feed block. Laminated molten resin P flows into the die, but the thickness is made uniform in width direction W at the time when it flows into the die. Accordingly, the thickness of the resin sheet is made further uniform in width direction W.

The resins that merge in merging section 23 flow through channel 24 as laminated molten resin P. While laminated molten resin P flows through channel 24, the flow velocity of laminated molten resin P is made uniform in width direction W. Preferably, variation of the flow velocity of laminated molten resin P in width direction W is within 10% of the average flow velocity thereof. Auxiliary material B fills void region 36, forming an inclined shape at the end thereof with regard to the width direction. Although auxiliary material B may be deformed to some degree within main material A, the cross-sectional shape thereof does not significantly change. Channel 24 for the laminated molten resin has a substantially rectangular cross section, and the shape of the cross section is constant in depth direction D. Thus, laminated molten resin P is extruded with a substantially uniform thickness in width direction W, and the shape of the cross section is maintained after extruded. Therefore, product sheet S having a uniform thickness in width direction W can be obtained regardless of the position and shape of auxiliary material B.

In this way, laminated molten resins P having various layer constructions can be formed by adjusting the configuration of merging section 23 or channel forming elements 31a to 31d. Various configurations of merging section 23 will be described below.

Figure 9B:
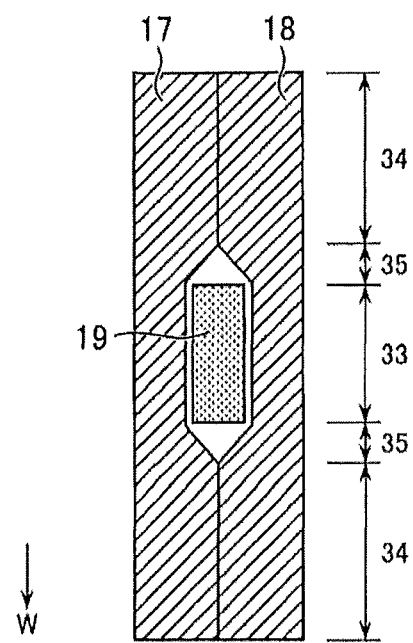
FIG. 9B is a developed view of the merging section of a feed block according to another embodiment.

Referring to FIG. 9B, first region 33 is positioned at the center of merging section 23 with regard to width direction W. In other words, second region 34 is divided by first region 33 in width direction W. Merging section 23 of this shape can be formed by shaping second channel forming element 31b and third channel forming element 31c such that they abut against each other at both sides thereof with regard to width direction W and that they do not abut against each other (a gap is formed) at the center thereof with regard to width direction W. First channel forming element 31a and fourth channel forming element 31d may be the same as those in FIG. 9A. By using feed block 3 of this embodiment, it is possible to manufacture product sheet S having auxiliary material B embedded in the central region.

Figure 9C:
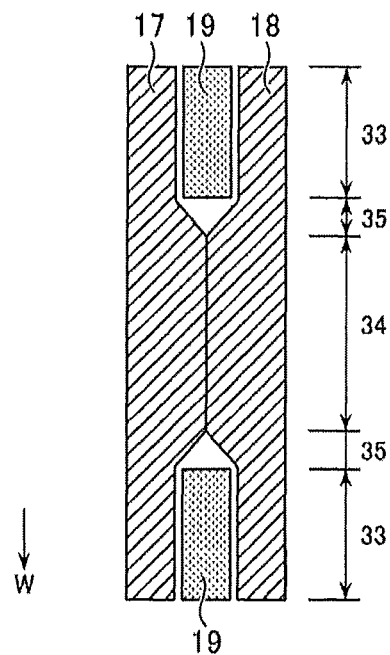
FIG. 9C is a developed view of the merging section of a feed block according to another embodiment.

Referring to FIG. 9C, two first regions 33 are positioned at both ends of merging section 23 with regard to width direction W. Two first regions 33 have the same shape, but may be different from each other. Merging section 23 of this shape can be formed by shaping second channel forming element 31b and third channel forming element 31c such that they abut against each other at the center thereof with regard to width direction W and that they do not abut against each other (a gap is formed) at both sides thereof with regard to width direction W.

Figure 9D:
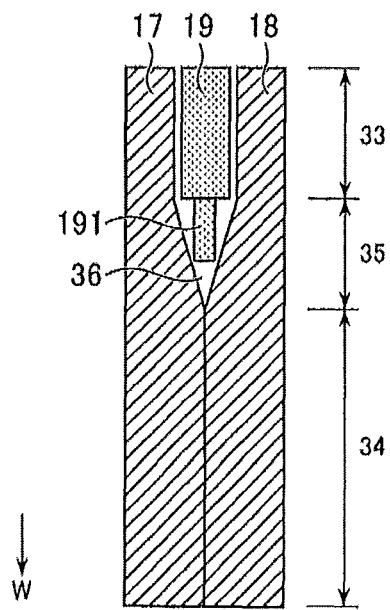
FIG. 9D is a developed view of the merging section of a feed block according to another embodiment.

Referring to FIG. 9D, part 191 of auxiliary material forming channel 19 is formed in transition region 35. When transition region 35 is long in the width direction. i.e., when the angle of the inclination of the end region of auxiliary material B relative to width direction W is small, void region 36 in transition region 35 where there is neither the main material forming channel nor auxiliary material forming channel 19 present is relatively enlarged. Auxiliary material B efficiently fills void region 36 and the end region of auxiliary material B can be precisely formed by forming part 191 of auxiliary material forming channel 19 in void region 36. Merging section 23 of this shape can be formed by changing the size of the gap between second channel forming element 31b and third channel forming element 31c stepwise in width direction W. Although not illustrated, auxiliary material forming channel 191 is not limited to the rectangular cross section shown in FIG. 9D, and may be other shapes, such as a triangle. In that case, the size of the gap between second channel forming element 31b and third channel forming element 31c can be changed in width direction W in conformity to the shape of auxiliary material forming channel 191.

Figure 9E:
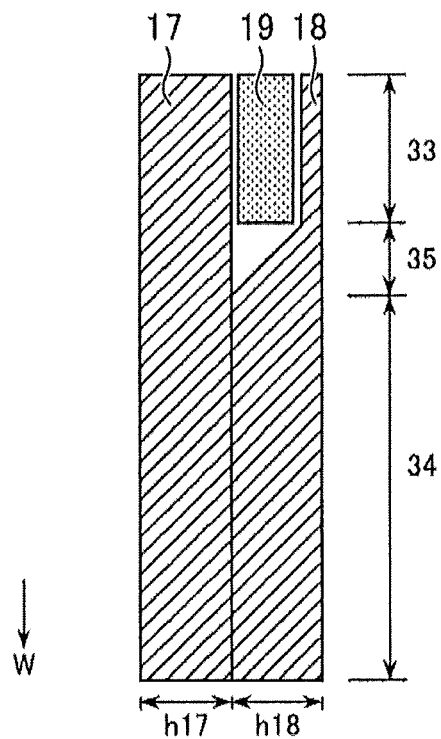
FIG. 9E is a developed view of the merging section of a feed block according to another embodiment.

Referring to FIG. 9E, first main material forming channel 17 and second main material forming channel 18 are in asymmetry with regard to width direction W. First main material forming channel 17 has a rectangular shape. Channel height h18 of second main material forming channel 18 decreases in one end region with regard to width direction W, and auxiliary material forming channel 19 is biased toward second main material forming channel 18. The present embodiment is useful when adjusting the position of auxiliary material B of product sheet S in the thickness direction.

Figure 9F:
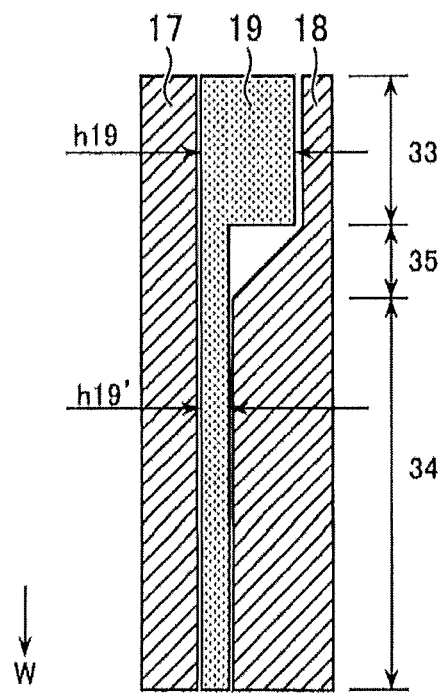
FIG. 9F is a developed view of the merging section of a feed block according to another embodiment.

Referring to FIG. 9F, auxiliary material forming channel 19 merges with main material forming channels 17, 18 not only in first region 33 but also in second region 34. Channel height h19 of auxiliary material forming channel 19 of first region 33 is configured to be higher than channel height h19' of auxiliary material forming channel 19 of second region 34. However, the combined channel height of channel heights h17 and h18 of main material forming channels 17 and 18 and channel height h19 of auxiliary material forming channel 19 in first region 33 is substantially equal to the combined channel height of channel heights h17 and h18 of main material forming channels 17 and 18 and channel height h19' of auxiliary material forming channel 19 in second region 34. The present embodiment is useful when partially changing the thicknesses of the resin layers that form a sheet. Merging section 23 of this shape can be formed by changing the size of the gap between second channel forming element 31b and third channel forming element 31c in width direction W in conformity to the shape of auxiliary material forming channel 191.

Figure 9G:
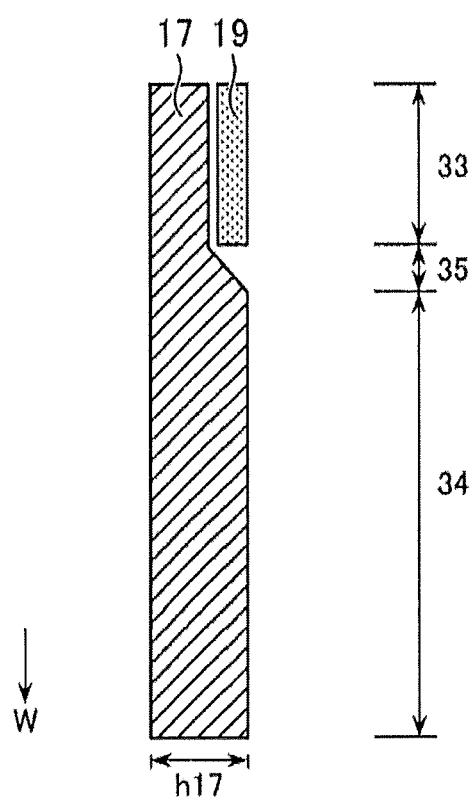
FIG. 9G is a developed view of the merging section of a feed block according to another embodiment.

Referring to FIG. 9G, a single main material forming channel 17 is provided, and channel height h17 decreases at one end thereof with regard to width direction W. Auxiliary material forming channel 19 is provided on one of the surfaces of main material forming channel 17. The present embodiment may be used to manufacture product sheet S having auxiliary material B exposed on a sheet surface, i.e., product sheet S that does not have an encapsulation structure.

Example

Next, some Examples will be described. Here, laminated molten resins were formed in which an auxiliary material was partially stacked in the width direction as an intermediate layer and an end of the auxiliary material in the width direction was inclined. Laminated molten resins having different configurations were formed by using a plurality of channel forming blocks. Polypropylene of a film forming grade (melt index (MI)=3) was used as a resin. The same resin was used both for the main material and for the auxiliary material, and the auxiliary material was colored with pigment in order to easily observe the shapes of the layers of the sheet that was formed. Channel 24 for the laminated molten resin of feed block 3 has a dimension of a width of 100 mm and a thickness of 25 mm. Laminated molten resin P that was fed from feed block 3 to die 4 was extruded from a rip (discharge port) of die 4. The rip has a width of 1200 mm and a thickness of 1 mm.

FIG. 11 shows the shapes of channel forming blocks 30, as well as cross sectional shapes of sheets that were actually obtained. The cross sectional shape was observed by an optical microscope. Example 1 used a channel forming block having a merging section whose shape is shown in FIG. 9A. Example 2 used a channel forming block having a merging section whose shape is shown in FIG. 9B. Example 3 used a channel forming block having a merging section whose shape is shown in FIG. 9C. Example 4 used a channel forming block having a merging section whose shape is shown in FIG. 9D. In each Example, an inclined structure was clearly formed at an end of the auxiliary material. There was no significant variation in the thickness of the auxiliary material in the width direction, and a substantially uniform thickness distribution was obtained. It can be estimated from this that the state of the layers of the main material and the auxiliary material that were formed in feed block 3 was substantially maintained in die 4.

The experiment for each embodiment was performed in about 1.5 hour. Specifically, first and second extruders 2A, 2B were stopped after one experiment was completed. Then, the channel forming block was replaced after confirming that the pressure of the resin in feed block 3 sufficiently dropped. Thereafter, a work to raise the temperature of the extruder was performed in about one hour in order to stabilize the temperature of the extruder, and then a next experiment was started. The replacement of the channel forming block was easily conducted in about 30 minutes. Thus, the condition for stacking auxiliary material B could be easily adjusted in a short time by using a feed block of the present embodiment.

The invention claimed is:

1. A feed block that feeds a laminated molten resin to a die, wherein said laminated molten resin has at least one main material that consists of molten resin in a first shape of a plate or a sheet and an auxiliary material that consists of another molten resin in a second shape of a plate or a sheet, wherein said auxiliary material is stacked on at least a part of said at least one main material along a width direction thereof, the feed block comprising:

at least one main material forming channel that allows molten resin to flow therethrough in order to form said main material into the first shape;

an auxiliary material forming channel that allows molten resin to flow therethrough in order to form said auxiliary material into the second shape;

a merging section that forms said laminated molten resin wherein said at least one main material forming channel and said auxiliary material forming channel merge at said merging section and a channel for said laminated molten resin that is located downstream of said merging section and that feeds said laminated molten resin to said die, wherein said merging section has a first region in the width direction and a second region in the width direction, said auxiliary material forming channel merges with said at least one main material forming channel at said first region and said second region only consists of said at least one main material forming channel, wherein a combined channel height of a channel height of said at least one main material forming channel in said first region and a channel height of said auxiliary material forming channel in said first region is substantially equal to a channel height of said second region.

2. The feed block according to claim 1, further comprising a transition region between said first region and said second region wherein a channel height of said at least one main material forming channel increases in said transition region toward said second region.

3. The feed block according to claim 2, wherein a part of said auxiliary material forming channel is formed in said transition region.

4. The feed block according to claim 1 wherein said first region is positioned at one end of said merging section in the width direction.

5. The feed block according to claim 4, wherein said merging section has a third region that is positioned at another end of said merging section in the width direction wherein said auxiliary material forming channel merges with said at least one main material forming channel at said third region and a combined channel height of a channel height of said at least one main material forming channel in said third region and a channel height of said auxiliary material forming channel in said third region is substantially equal to the channel height of said second region.

6. The feed block according to claim 1 wherein said second region is divided by said first region in the width direction.

7. The feed block according to claim 1, further comprising:

a housing having an internal space; and a channel forming block that is removably housed in said internal space, wherein said channel forming block forms at least a part of said main material forming channel and at least a part of said auxiliary material forming channel.

8. The feed block according to claim 7, wherein said channel forming block consists of a plurality of channel forming elements that can be separated.

9. The feed block according to claim 8, wherein said at least one main material forming channel comprises a first main material forming channel and a second main material forming channel, wherein said auxiliary material forming channel is located between said first main material forming channel and said second main material forming channel, and said channel forming block includes first to fourth channel forming elements that extend radially from said merging section as viewed in the width direction wherein said first main material forming channel is formed between said first channel forming element and said second channel forming element, said auxiliary material forming channel is formed between said second channel forming element and said third channel forming element, and said second main material forming channel is formed between said third channel forming element and said fourth channel forming element.

10. A sheet manufacturing apparatus, comprising:

the feed block according to claim 1;

a die that is connected to an outlet of the feed block;

a first extruder that is connected to a first inlet of the feed block and that feeds the main material to the feed block and a second extruder that is connected to a second inlet of the feed block and that feeds the auxiliary material to the feed block.

11. A method of manufacturing a sheet, comprising:

feeding a main material that consists of molten resin by means of a first extruder;

feeding an auxiliary material that consists of molten resin by means of a second extruder;

forming the main material and the auxiliary material into a third shape of a plate or a sheet by means of the feed block according to claim 1 that is connected both to the first extruder and to the second extruder;

forming a laminated molten resin by stacking the auxiliary material on at least a part of the main material along a width direction thereof by means of said feed block;

feeding said laminated molten resin to a die; and extruding a sheet from said die.

12. A feed block that feeds a laminated molten resin to a die, wherein said laminated molten resin has at least one main material that consists of molten resin in a first shape of a plate or a sheet and an auxiliary material that consists of another molten resin in a second shape of a plate or a sheet, wherein said auxiliary material is stacked on at least a part of said at least one main material along a width direction thereof, the feed block comprising:

at least one main material forming channel that molten resin to flow therethrough in order to form said main material into the first shape;

an auxiliary material forming channel that allows molten resin to flow therethrough in order to form said auxiliary material into the second shape;

a merging section that forms said laminated molten resin wherein said at least one main material forming channel and said auxiliary material forming channel merge at said merging section and a channel for said laminated molten resin that is located downstream of said merging section and that feeds said laminated molten resin to said die, wherein said merging section has a first region and a second region that are arranged in the width direction, said auxiliary material forming channel merges with said at least one main material forming channel at said first region and said second region only consists of said at least one main material forming channel, wherein a flow velocity of said laminated molten resin in said channel for said laminated molten resin is substantially constant in a width direction of said laminated molten resin.

13. The feed block according to claim 12, further comprising:
- a housing having an internal space; and
- a channel forming block that is removably housed in said internal space,
- wherein said channel forming block forms at least a part of said main material forming channel and at least a part of said auxiliary material forming channel.

14. The feed block according to claim 13, wherein said channel forming block consists of a plurality of channel forming elements that can be separated.

15. The feed block according to claim 14, wherein said at least one main material forming channel comprises a first main material forming channel and a second main material forming channel, wherein said auxiliary material forming channel is located between said first main material forming channel and said second main material forming channel, and
- said channel forming block includes first to fourth channel forming elements that extend radially from said merging section as viewed in the width direction wherein said first main material forming channel is formed between said first channel forming element and said second channel forming element, said auxiliary material forming channel is formed between said second channel forming element and said third channel forming element, and said second main material forming channel is formed between said third channel forming element and said fourth channel forming element.

16. A sheet manufacturing apparatus, comprising:
- the feed block according to claim 12;
- a die that is connected to an outlet of the feed block;
- a first extruder that is connected to a first inlet of the feed block and that feeds the main material to the feed block and
- a second extruder that is connected to a second inlet of the feed block and that feeds the auxiliary material to the feed block.

17. A method of manufacturing a sheet, comprising:
- feeding a main material that consists of molten resin by means of a first extruder;
- feeding an auxiliary material that consists of molten resin by means of a second extruder;
- forming the main material and the auxiliary material into a third shape of a plate or a sheet by means of the feed block according to claim 12 that is connected both to the first extruder and to the second extruder;
- forming a laminated molten resin by stacking the auxiliary material on at least a part of the main material along a width direction thereof by means of said feed block;
- feeding said laminated molten resin to a die; and
- extruding a sheet from said die.

* * * * *